United States Patent
Wobben

(10) Patent No.: US 7,365,446 B2
(45) Date of Patent: Apr. 29, 2008

(54) WIND POWER PLANT HAVING POWER MODULE MOUNTED ON TOWER FOUNDATION AND METHOD FOR USE IN CONSTRUCTING SAME

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 24 days.

(21) Appl. No.: 10/477,299

(22) PCT Filed: Sep. 12, 2002

(86) PCT No.: PCT/EP02/10212

§ 371 (c)(1),
(2), (4) Date: Nov. 10, 2003

(87) PCT Pub. No.: WO03/025392

PCT Pub. Date: Mar. 27, 2003

(65) Prior Publication Data

US 2004/0131467 A1    Jul. 8, 2004

(30) Foreign Application Priority Data

Sep. 14, 2001 (DE) ................. 101 45 414

(51) Int. Cl.
F03D 9/00 (2006.01)
H02P 9/04 (2006.01)
F02B 63/04 (2006.01)
H02K 7/10 (2006.01)
H02K 7/18 (2006.01)

(52) U.S. Cl. .................. 290/55; 290/44; 290/1 C; 52/125.3; 52/125.6; 52/414

(58) Field of Classification Search .......... 290/55, 290/44, 1 C; 52/125.3, 125.6, 292–299, 52/414, 745.19–745.2
See application file for complete search history.

(56) References Cited

U.S. PATENT DOCUMENTS 1,415,645 A * 5/1922 Holterud ................ 416/50

(Continued)

FOREIGN PATENT DOCUMENTS

AT      191 530      8/1957

(Continued)

OTHER PUBLICATIONS

"Le poste socle dans la mise en souterrain des réseaux ruraux", M. Orlhac, Revue Generale de L'Electricite, RGE, Paris, France, No. 4/93, Apr. 1993, pp. 23-25.

(Continued)

Primary Examiner—Darren Schuberg
Assistant Examiner—Pedro J. Cuevas
(74) Attorney, Agent, or Firm—Neil A. Steinberg

(57) ABSTRACT

The invention relates to a method for constructing a wind energy plant and to a wind energy plant as such. An aim of one aspect of the invention is to provide a method for constructing wind energy plants at lower expenses and more rapidly. According to one aspect, a method for constructing a wind energy plant that comprises a tower that is based on a foundation and an electrical power module, the power module is mounted on the tower foundation before the tower itself is constructed. The power module comprises a transformer and optionally an inverter or other electrical installations, such as for example switch cabinets, that are provided for controlling the wind energy plant and/or for guiding the electrical power that is provided by the generator of the wind energy plant and that is fed to a network.

33 Claims, 3 Drawing Sheets

U.S. PATENT DOCUMENTS

| | | | |
|---|---|---|---|
| 1,633,460 A * | 6/1927 | Silvestrin | 416/150 |
| 2,106,557 A * | 1/1938 | Putnam | 290/44 |
| 2,417,022 A * | 3/1947 | Stagg | 416/15 |
| 3,891,899 A | 6/1975 | Sparling | 361/622 |
| 3,921,355 A | 11/1975 | Pennecot | 52/262 |
| 3,942,026 A * | 3/1976 | Carter | 290/55 |
| 3,944,839 A * | 3/1976 | Carter | 290/55 |
| 4,012,163 A * | 3/1977 | Baumgartner et al. | 415/208.3 |
| 4,017,698 A | 4/1977 | Kuhn et al. | 200/50.21 |
| 4,066,911 A * | 1/1978 | Sarchet | 290/44 |
| 4,068,131 A * | 1/1978 | Jacobs et al. | 290/55 |
| 4,228,363 A * | 10/1980 | Jacobs et al. | 290/44 |
| 4,272,929 A * | 6/1981 | Hanson | 52/40 |
| 4,291,233 A * | 9/1981 | Kirschbaum | 290/44 |
| 4,340,822 A * | 7/1982 | Gregg | 290/55 |
| 4,406,094 A * | 9/1983 | Hempel et al. | 52/40 |
| 4,449,053 A * | 5/1984 | Kutcher | 290/44 |
| 4,551,631 A | 11/1985 | Trigilio | 290/55 |
| 4,565,929 A * | 1/1986 | Baskin et al. | 290/44 |
| 4,609,827 A * | 9/1986 | Nepple | 290/44 |
| 4,673,822 A * | 6/1987 | Kikuchi | 290/44 |
| 4,772,999 A | 9/1988 | Fiorina et al. | 363/141 |
| 4,873,028 A | 10/1989 | Garrish | 261/109 |
| 5,075,564 A * | 12/1991 | Hickey | 290/55 |
| 5,140,856 A * | 8/1992 | Larsen | 73/455 |
| 5,254,876 A | 10/1993 | Hickey | 290/55 |
| 5,285,112 A | 2/1994 | Mann | 290/44 |
| 5,487,849 A | 1/1996 | Curtis | 261/30 |
| 5,499,482 A * | 3/1996 | Goff | 52/742.13 |
| 6,173,537 B1 | 1/2001 | Davidsson et al. | 52/40 |
| 6,191,496 B1* | 2/2001 | Elder | 290/55 |
| 6,270,308 B1 | 8/2001 | Groppel | 415/4.3 |
| 6,400,039 B1* | 6/2002 | Wobben | 290/44 |
| 6,407,900 B1* | 6/2002 | Shirakawa et al. | 361/117 |
| 6,425,708 B1 | 7/2002 | Siegfriedsen | 405/154.1 |
| 6,439,832 B1 | 8/2002 | Siegfriedsen | 415/4.3 |
| 6,448,669 B1* | 9/2002 | Elder | 290/54 |
| 6,470,645 B1 | 10/2002 | Maliszewski et al. | 52/745.18 |
| 6,661,113 B1* | 12/2003 | Bonin | 290/44 |
| 6,665,990 B1* | 12/2003 | Cody et al. | 52/295 |
| 6,672,023 B2* | 1/2004 | Henderson | 52/296 |
| 6,676,122 B1 | 1/2004 | Wobben | 290/55 |
| 6,688,842 B2* | 2/2004 | Boatner | 415/4.2 |
| 6,702,522 B2* | 3/2004 | Silber | 405/229 |
| 6,710,468 B1* | 3/2004 | Marrero O'Shanahan | 290/55 |
| 6,713,891 B2* | 3/2004 | Kirkegaard et al. | 290/44 |
| 6,734,576 B2 | 5/2004 | Pacheco | 290/55 |
| 6,766,643 B2* | 7/2004 | Christensen | 60/398 |
| 6,782,667 B2* | 8/2004 | Henderson | 52/116 |
| 6,798,082 B1 | 9/2004 | Chen | 290/55 |
| 6,841,894 B2* | 1/2005 | Gomez Gomar | 290/55 |
| 6,946,751 B2* | 9/2005 | Yoshida et al. | 290/44 |
| 7,057,305 B2* | 6/2006 | Kruger-Gotzmann et al. | 290/55 |
| 7,066,709 B2* | 6/2006 | Kim et al. | 415/4.3 |
| 7,137,225 B2* | 11/2006 | Zuppan | 52/169.14 |
| 7,155,875 B2* | 1/2007 | Henderson | 52/741.15 |
| 7,171,787 B2* | 2/2007 | Thomason et al. | 52/169.7 |
| 7,178,298 B1* | 2/2007 | Ebeling, Sr. | 52/293.3 |
| 7,178,406 B2* | 2/2007 | Gonzalez et al. | 73/856 |
| 7,185,467 B2* | 3/2007 | Marty | 52/425 |
| 2006/0013689 A1* | 1/2006 | Wobben | 416/132 B |

FOREIGN PATENT DOCUMENTS

| | | |
|---|---|---|
| DE | 15 09 511 | 8/1979 |
| DE | 37 32 670 | 4/1989 |
| DE | 94 17 738.4 | 12/1994 |
| DE | G 94 17 738.4 | 2/1995 |
| DE | 42 41 952 C2 | 3/1996 |
| DE | 295 18 899 | 1/1997 |
| DE | 198 21 592 A1 | 1/1999 |
| DE | 198 16 483 | 10/1999 |
| DE | 198 16 483 A1 | 10/1999 |
| DE | 198 59 628 | 3/2000 |
| DE | 198 60 211 | 11/2000 |
| DE | 198 60 211 C1 | 11/2000 |
| DE | 201 02 051 U1 | 6/2001 |
| DE | 199 62 453 C1 | 7/2001 |
| DE | 100 13 442 C1 | 10/2001 |
| DE | 101 19 429 A1 | 10/2002 |
| DE | 101 45 414 A1 | 5/2003 |
| DE | 10310036 A1 * | 8/2004 |
| DK | 97 00453 | 3/1998 |
| DK | 97 00453 U3 | 3/1998 |
| DK | 2000 00086 U3 | 5/2000 |
| EP | 0 675 246 | 10/1995 |
| EP | 0 675 246 A1 | 10/1995 |
| EP | 1 389 581 | 2/2004 |
| JP | 61-105768 | 7/1986 |
| JP | 62020678 | 1/1987 |
| JP | 07 122438 | 5/1995 |
| JP | 2000161197 | 6/2000 |
| JP | 2000213451 | 8/2000 |
| JP | 2006240381 | 9/2006 |
| WO | WO 99/30031 | 6/1999 |
| WO | WO 00/39903 | 7/2000 |
| WO | WO 01/06121 A1 | 1/2001 |
| WO | WO 03/025392 A1 | 3/2003 |
| WO | WO 03025392 A1 * | 3/2003 |
| WO | WO 2004067959 A1 * | 8/2004 |

OTHER PUBLICATIONS

"DeWind Strategische Allianz mit Krupp", Wind-Kraft Journal, Sonderausgabe 1997, Seite 84, Verlag Natürliche Energie GmbH, 24811 Brekendorf.

Neue Energie, Nr. 10/Oct. 1998, Uranus Verlagsges mbH, Neustiftgasse 115A/Top20, A-1070 Wien.

"Bonus Info, The Neverending Story", Henrik Stiesdal et al., Winter 1999, pp. 1-2 and 5-9.

Wind-Kraft Journal, Sonderausgabe—Jobs in der Windenergie 2000, Verlag Natürliche Energie GmbH, 24811 Brekendorf.

"Experience from the Establishment of Middelgrunden 40 MW Offshore Wind Farm", Hans Christian Sorensen et al., 2001 European Wind Energy Conference, Copenhagen, Denmark, Jul. 1-7, 2001.

Windenergieanlage vom Typ MD70, Aufstellung der Anlage: 1998, Artikel von Björn Johnsen in "Erneuerbare Energien" Ausgabe 7/99, "MD 70: 1.500kW-Mühle mit schlankem Design".

Eidesstattliche Versicherung des Herrn Gutmundt Ertel hinsichtlich des Verfahrens zum Aufbau der MD 70 in Lichterfelde.

"North Sea Offshore Wind—A Powerhouse for Europe, Technical Possibilities and Ecological Considerations", Deutsches Windenergie Institut (DEWI), Greenpease e.V., Oct. 2000, pp. 1-2 and 32-56.

"Introduction to Modern Wind Turbines", David A. Spera, Ph.D., Wind Turbine Technology—Fundamental Concepts of Wind Turbine Engineering, New York, S.47-72, 1994.

"A Feasibility Study on Offshore Wind Turbine Systems", B. Björk, Wind Engineering, vol. 9, No. 4, 1985, pp. 243-255.

"Sachsenspiegel": A DVD containing the news cast by the "Mittledeutscher Rundfunk (mdr)" broadcasted in Aug. 1995.

Fotos von der HSW 250 mit der Bau-Nr.: 16 im "Nordfriesland Windpark" im Friedrich-Wilhelm-Lübcke-Koog vom Feb. 6, 2004.

Eidesstattliche Versicherung von Herrn Hans-Dieter Struck zur Aufstellung der HSW 250 sowie der Bestätigung, dass diese Anlagen so wie sie heute zu beslchtigen sind, den ursprünglich errichteten Anlagen entsprechen, Dec. 22, 2004.

Informationsbroschüre zur Nordfriesland Windpark GmbH & Co.KG, herausgegeben von der BVT Beratungs-, Verwaltungs- und Treuhandgesellschaft für internationale Vermögensanlagen mbH, München, Jun. 2004.

OD #1: English translation of Windenergieanlage vom Typ MD70, Aufstellung der Anlage: 1998, Artikel von Björn Johnsen in "Erneuerbare Energien" Ausgabe 7/99, "MD 70: 1.500-kW-Mühle mit schlankem Design".

OD #2: English translation of Windenergeanlege vom Type MD70, Aufstellung der Anlage: 1998, Auflistung der in der Zeit von 1998 bis Jul. 2001 errichteter MD70-Anlagen.

OD #3: English translation of Fotos 1-7 vom Aufbau der MD 70 mit der Bau-Nr.: 70002-01, Standort Lichterfelde in der Zeiti vom 9-15. Feb. 2000.

OD #4: English translation of Eidesstaffliche Versicharung des Herrn Gutmundt Ertel Hinsichtlich dea Verfahrens zum Aufbau der MD 70 in Lichtarfelde, Dec. 2004.

* cited by examiner

WIND POWER PLANT HAVING POWER MODULE MOUNTED ON TOWER FOUNDATION AND METHOD FOR USE IN CONSTRUCTING SAME

RELATED INFORMATION

The invention concerns a method for constructing a wind power plant as well as the wind power plant itself in its configuration.

Thus far, when constructing wind power plants there is first produced a foundation, then the tower of the wind power plant is erected and subsequently the machine house is outfitted at the tip of the tower and the rotor is affixed with the rotor blades. After this, the electric power modules such as transformer, switch cabinets, possibly inverters, a medium-voltage system, a low-voltage distribution, etc., are installed. This is almost always done in a special small building outside the wind power plant.

In DE 198 16 483.1 it has already been proposed to accommodate the transformer inside the tower, so that it is no longer necessary to construct a special transformer building with its own foundation.

SUMMARY OF THE INVENTION

The purpose of one aspect of the invention, now, is to develop a method by which the construction of wind power plants can be done even more advantageously, but especially even faster. According to one aspect of the invention, it is proposed, in departure from the design of wind power plants heretofore, after constructing the foundation of the wind power plant, to place the essential power modules, i.e., transformer, switch cabinets, etc., on the foundation and only then erect the tower, so that all of the power modules after the erection of the tower are protected in the region of the tower foundation or in the lower part of the tower and rest safely on the tower foundation.

The power modules are prefabricated as much as possible and mounted on carriers, so that the power modules can be set up on the tower foundation by a crane, which is needed anyway to construct a wind power plant, and the entire operational readying, especially the laying of cables and the entire operational preparation of the wind power plant, can occur in a protected space by adjustment of individual control modules, outfitting of the switch cabinets, etc., and these activities can commence once the tower has been constructed.

It is also especially advantageous for the carriers of the power modules to have support feet, which in turn rest on prepositioned plates on the tower foundation. These plates are already fitted in front of determined positions during the creation of the foundation and they are fixed to the foundation so that the power modules can also be set up afterwards in very simple way and manner.

Finally, it is also very advantageous to provide empty conduit cross arms in the foundation of the wind power plant for the cables leading out from the plant, i.e., especially the power transmission cables, control cables, etc., and to install these empty conduit cross arms in predetermined positions. For this, the cross arms are held by holding arms, which in turn are fixed in portions of the foundation or in the lower section of a tower. With these empty conduit cross arms, the region of the cable laying can be exactly predetermined and also in particular laid such that the cables extending from the power module to the foundation have the shortest and an optimal cable route.

The measures according to one aspect of the invention thus also facilitate the overall electrical equipment of the wind power plant by a prefabrication of individual modules such as the empty conduit cross arms, power module carriers, etc., as early as the construction of the foundation.

With the steps according to one aspect of the invention, the entire construction time for the wind power plant can be considerably shortened. Also, with one aspect of the invention, the costs for the overall equipment of the wind power plant can be reduced, without having to balance this with technical disadvantages of any kind.

Aspects of the invention shall be explained more closely hereafter by means of an example shown in a drawing.

DETAILED DESCRIPTION

Figure 1:
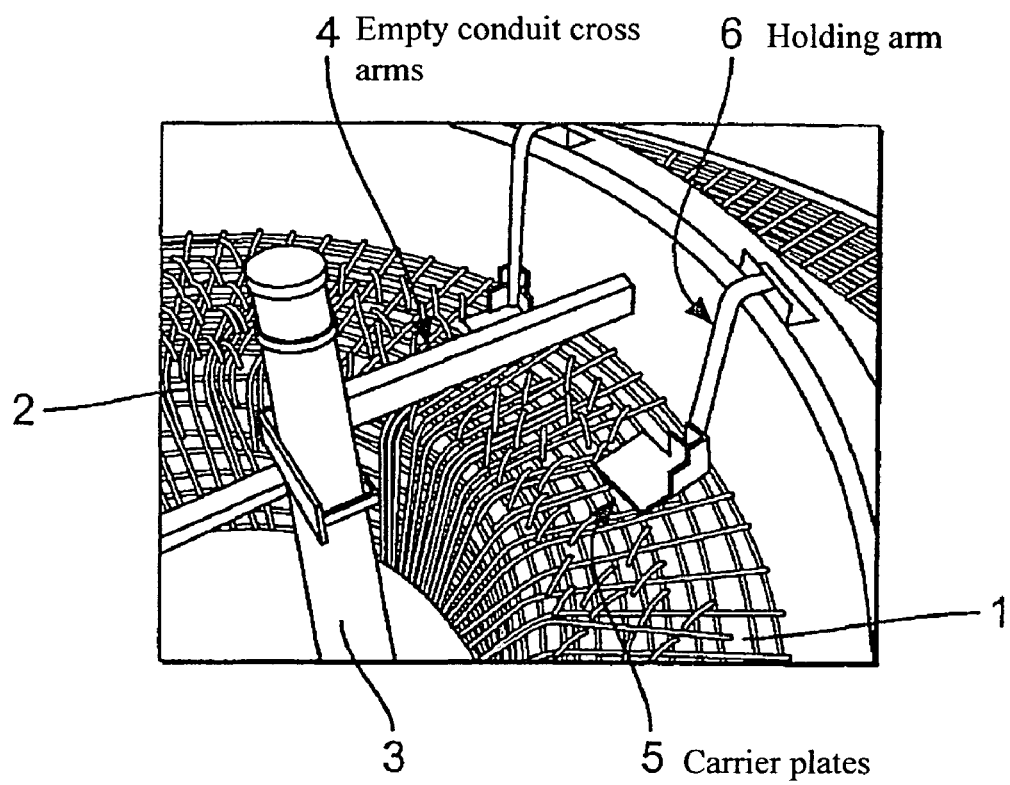
FIG. 1 is a top perspective view of a section of a foundation for a wind power plant, prior to filling the section of the foundation with concrete.

FIG. 1 shows a top view of a prearranged foundation (without concrete fill) with a steel reinforcement 1 and 2, on an empty conduit 3, which is supported via a brace 4 with a lowermost tower section adjoining the reinforcement. Furthermore, one notices carrier plates 5, which are arranged for holding arms 6 in the lowermost tower section (which will no longer be visible after constructing the wind power plant).

The empty conduit 3 afterwards serves to accommodate cables, such as the power cable, by means of which the entire electric energy of the wind power plant is taken away to the network via ground cables. Often, several pipes are provided for this, rather than only one pipe.

Figure 2:
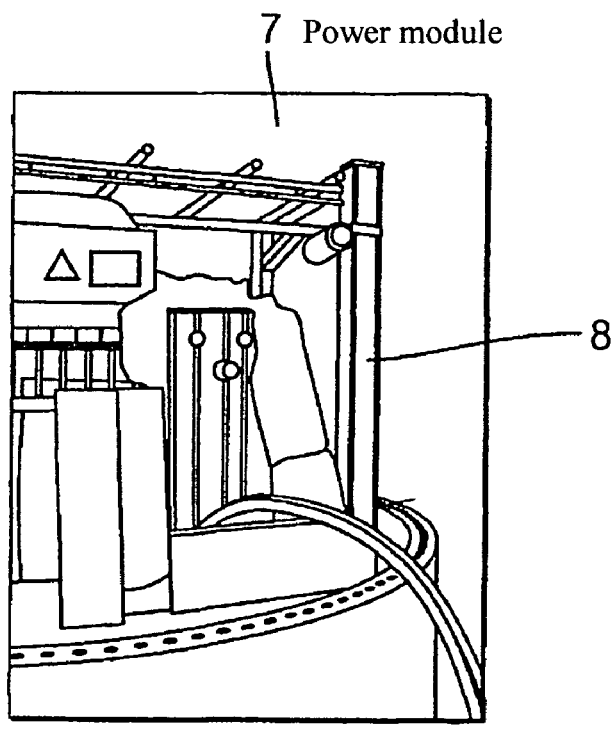
FIG. 2 is a perspective view of a portion of a power module positioned on the foundation of FIG. 1, after filling the foundation with concrete.

FIG. 2 shows the foundation section after filling the concrete. Here, one notices that the empty conduits remain in their previously fixed position and the carrier plates have also been invested with concrete; during the concreting, it is important that the carrier plates lie snug on the structural concrete and thus afford a load support spread out over a surface. The concrete reaches to the upper edge of the carrier plates and is carefully worked at the edge of the plate.

After the hardening of the concrete, the holding arms for holding the carrier plates and also the cross arms for attachment of the empty conduits can be dismantled and used again to construct other plants.

Figure 3:
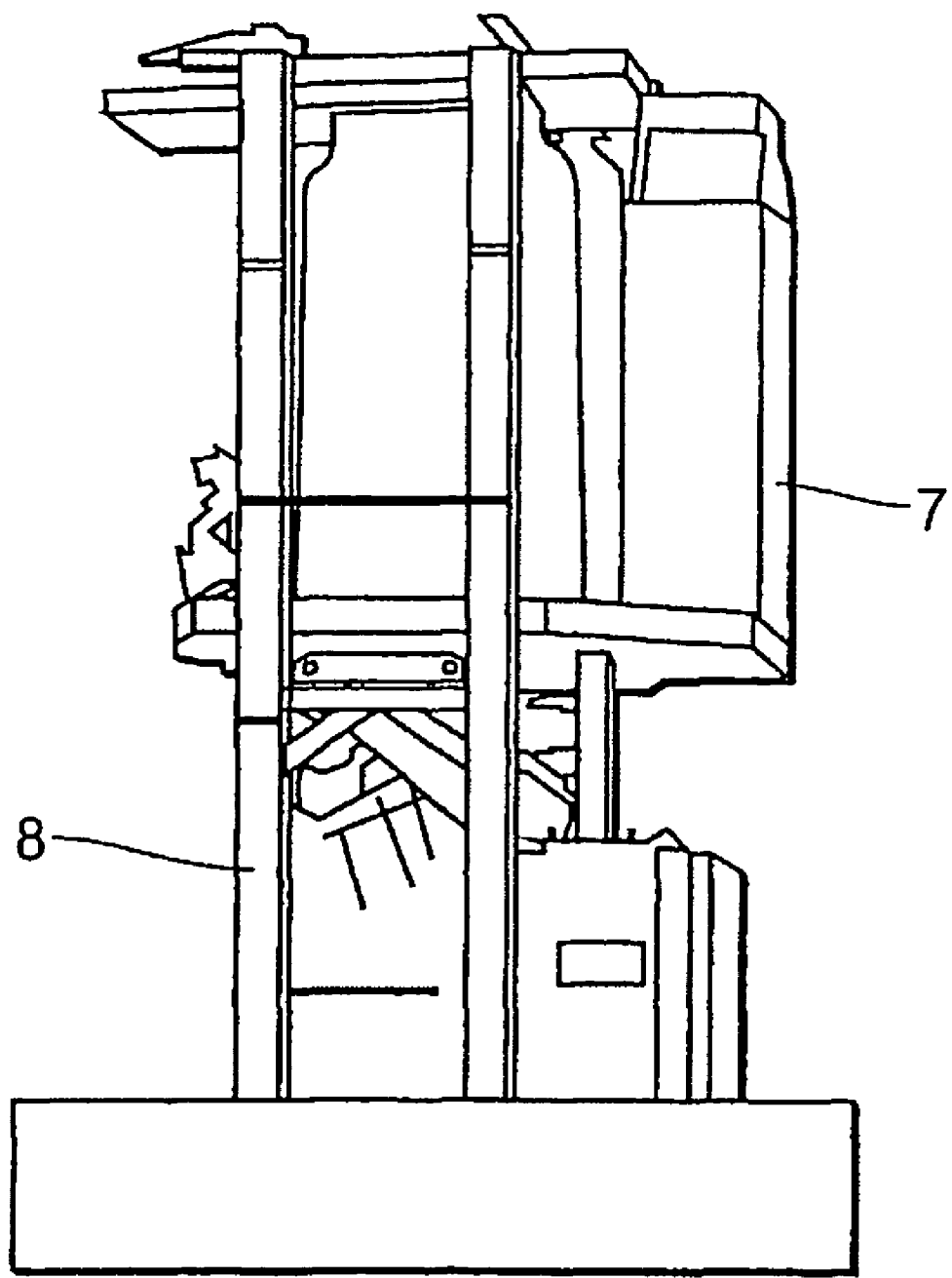
FIG. 3 is a perspective view of the power module of FIG. 2 along with a representation of the foundation of FIG. 1.
Figure 4:
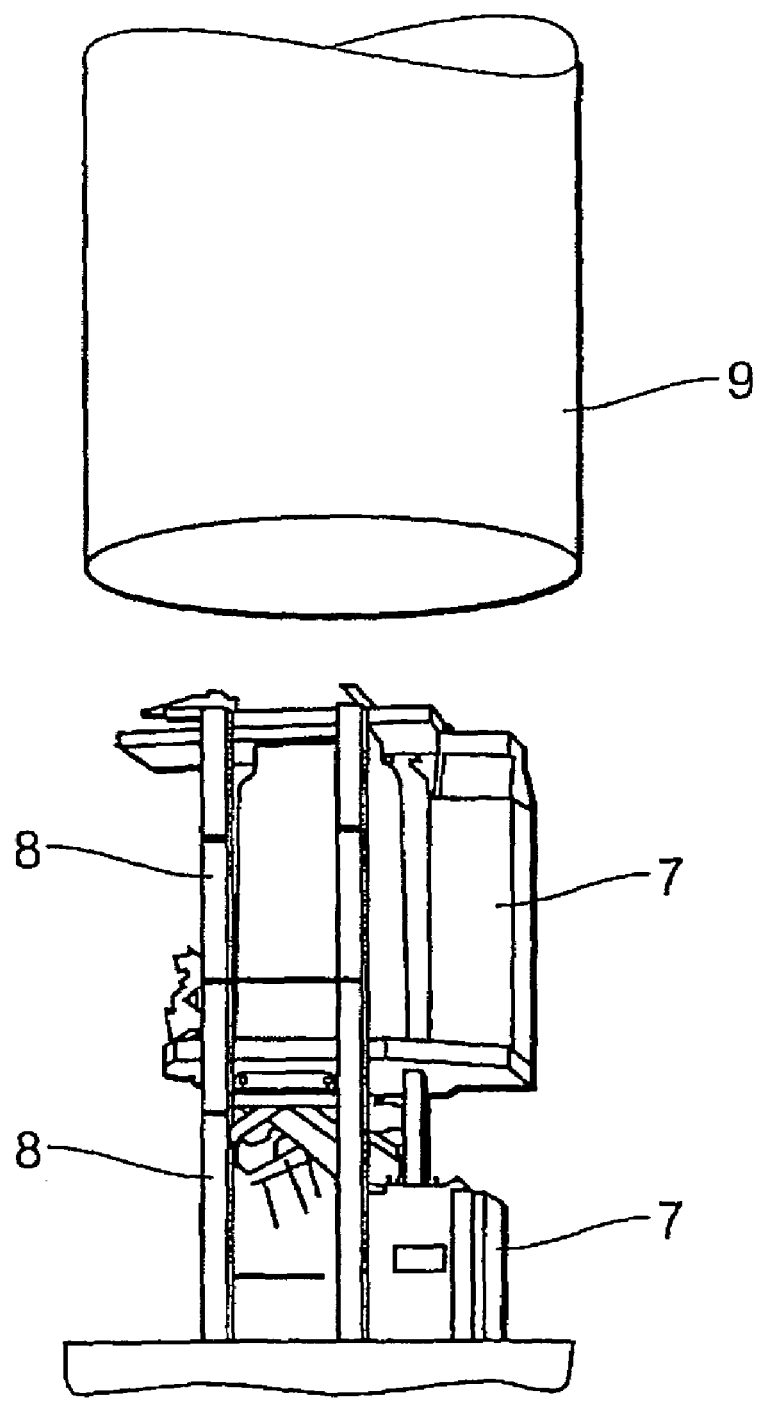
FIG. 4 is a perspective view of the power module of FIG. 2 along with a representation of the foundation of FIG. 1 and an erected tower prior to sliding the tower over the power module.

After the hardening of the concrete, when constructing the rest of the wind power plant, the tower is not placed on the lowermost foundation for the tower section—as was usual heretofore—but instead a power module 7 is first placed on the carrier plates 5 (FIGS. 2, 3 and 4).

Such a power module 7 is shown in FIG. 3 in a two-part design, although the power module can also consist of additional parts.

The two parts of the power module 7 are placed one on the other in the depicted example and the overall power module consists of two fitted-together carriers 8, which in turn support important parts of the power modules, i.e., the transformer, inverter, switch cabinets, medium-voltage layout, etc.

The fitted-together carriers 8 are constructed in the manner of a frame and fit together exactly, so that a reliable securing to each other is also assured. The individual carriers have four vertically oriented spars—subtending a rectangle—joined together at the bottom. These spars are screwed together at their lower and upper end.

After mounting the electric power module on the foundation, the tower 9 is erected (FIG. 4) and slipped over the power module. For this, the outer dimensions of the power module in terms of width and length are smaller than the inner diameter of the tower in the lower tower region/foundation region.

After erecting the tower, the wind power plant is outfitted with the machine house, as usual, the rotor is mounted, and appropriate electrical connections are produced between the generator and the power module 7 to enable operation and the power module (output of the transformer) is also hooked up to the power supply network.

When the above described empty conduits or devices provided for laying the cables have been previously secured in particular prescribed position, the connection between the power module and the network can also be produced extremely fast and advantageously, with minimal overall cable lengths, because the empty conduits are positioned where they mate precisely with the corresponding parts of the power module.

In the wind power plant of one aspect of the invention, it is also advantageous for the access to the wind power plant to no longer necessarily be through a conventional door in the fixed region of the foundation, but instead through a door (access) which is positioned so that it emerges in the region above the parts of the power module carrying the high or medium voltage. For this, a corresponding ladder or stairs can be provided on the outside of the tower. This positioning of the access door has the advantage that the personnel who have to visit the plant frequently do not have to constantly walk past the parts of the power module carrying high or medium voltage when the plant is in operation. This also ensures that no one is in direct proximity to the power module by accident or mistake during the operation of the wind power plant and makes contact with the parts carrying voltage or current, which might cause a major accident.

In the region of the access door of the tower, an appropriate intermediate platform is then provided, which can be used by personnel entering the tower, so that they can move up higher in the wind power plant on the inside of the tower or make adjustments to various control devices or read off measurement data.

A wind power plant of the invented type generally has available more than 100 kW of rated power, preferably a power rating in the range of 500 kW, 1 MW, 1.5 MW, or considerably more. Preferably, the intermediate platform is provided with a locking plate, through which the personnel can enter the lower region of the power module. Locking of the hatch affords further protection of the lower part of the power module against unauthorized access.

The inner diameter of the tower in the foundation region can be several meters, so that the overall surface there is 100 m$^2$ or more and therefore a sufficiently large area is also available to accommodate the power modules. Insofar as the term "power module" is used in this application, it means the medium and high voltage carrying part of the wind power plant. These are, in particular, the units such as transformer or inverter or emergency switch and the medium voltage switch cabinet or also the low voltage distributor.

The invention claimed is:

1. A method of constructing a wind power plant having (i) a foundation, (ii) a tower, (iii) a generator disposed on the tower and driven by a rotor, and (iv) an electrical power module, wherein the electrical power module includes at least a transformer, the method comprising:
    arranging a form of the foundation:
    arranging at least a portion of a conduit at a predetermined location within the form of the foundation so that the portion of the conduit is fixed in the foundation after providing the foundation:
    providing the foundation:
    placing the electrical power module on the foundation;
    connecting an electrical cable to the electrical power module wherein at least a portion of the electrical cable is disposed in the portion of the conduit which is fixed in the foundation;
    constructing or placing the tower on the foundation after placing the electrical power module on the foundation;
    mounting the generator on the tower; and
    mounting rotor blades on the rotor, wherein the rotor blades are exposed to wind.

2. The method of claim 1 wherein the electrical power module further includes an inverter and/or another electrical device to control the wind power plant and/or conduct the electric power furnished by the generator of the wind power plant.

3. The method of claim 1 wherein the electrical power module includes a device to receive electrical power furnished by the generator.

4. The method of claim 3 wherein the electrical power module includes a device to transfer the electrical power to the power cable connected to a power network located outside the wind power plant.

5. The method of claim 1 wherein the electrical power module includes a device to control the wind power plant.

6. The method of claim 1 further comprising supplying the electrical power module with electrical power furnished by the generator.

7. The method of claim 6 further comprising transferring the electrical power to a power network located outside the wind power plant via the electrical cable.

8. The method of claim 1 further comprising supplying control signals from the electrical power module to control the wind power plant.

9. The method of claim 1 further including:
    arranging a plurality of carrier plates at predetermined locations within the form of the foundation so that carrier plates are fixed in. on or to the foundation after providing the foundation; and
    wherein the electrical power module further includes a carrier and wherein placing the electrical power module on the foundation comprises mounting the carrier on the carrier plates.

10. The method of claim 9 wherein the carrier plates are set in the foundation at predetermined locations.

11. The method of claim 1 wherein providing the foundation includes filling the form of the foundation with concrete.

12. A wind power plant comprising:
    a tower set on a foundation;
    a generator;
    a power module including:
        a transformer to transform electric energy furnished by the generator into; and a carrier that (i) receives the transformer and (ii) is set on the foundation;

a plurality of conduits, at least partially disposed and fixed in the foundation, to route cables connected to the electrical power module through the foundation; and a plurality of carrier plates, fixed in or to the foundation, to receive the power module.

13. The wind power plant of claim 12 wherein the power module further includes a device to control and/or conduct electric energy provided by the generator.

14. The wind power plant of claim 12 wherein the tower has a diameter in a foundation area and the power module has a width and/or a length that are less than the diameter of the tower in the foundation area.

15. The wind power plant of claim 12 wherein the tower includes a door to permit access the power module.

16. The wind power plant of claim 12 wherein the generator is disposed on the tower.

17. The wind power plant of claim 16 wherein the power module further includes a device to control electric energy provided by the generator.

18. The wind power plant of claim 12 wherein the plurality of carrier plates is disposed at the predetermined locations prior to finishing the foundation.

19. The wind power plant of claim 12 wherein the carrier comprises two carriers that are placed one on the other and configured so that they fit together and are secured to each other.

20. The wind power plant of claim 12 wherein the power module further includes an inverter and at least one switch cabinet for containing electrical control devices of the wind power plants.

21. The wind power plant of claim 12 further comprising conduits arranged in the foundation of the wind power plant to accommodate cables.

22. The wind power plant of claim 21 wherein the conduits are secured with cross arms prior to finishing the foundation.

23. The wind power plant of claim 21 wherein the cables connect to the power module.

24. The wind power plant of claim 12 wherein the carrier plates are set in the foundation at predetermined locations.

25. A method of constructing a wind power plant having (i) a foundation, (ii) a tower, (iii) a generator disposed on the tower and driven by a rotor of the wind power installation, and (iv) an electrical power module wherein the electrical power module includes at least a transformer, the method comprising:

arranging a form of the foundation;

arranging a plurality of carrier plates at predetermined locations within the form of the foundation and before Providing the foundation so that carrier plates are fixed in, on or to the foundation after providing the foundation:

providing the foundation;

positioning the electrical power module on the carrier plates such that its weight is supported by the foundation;

erecting or placing the tower over the electrical power module after positioning the electrical power module on the plurality of carrier plates such that the tower's weight is supported by the foundation;

mounting the generator on the tower; and mounting rotor blades on the rotor, wherein the rotor blades are exposed to wind.

26. The method of claim 25 wherein the electrical power module further Includes a carrier and the wind power plant further includes carrier plates that are set in the foundation, and wherein positioning the electrical power module such that its weight is supported by the foundation comprises placing the carrier on carrier plates.

27. The method of claim 26 further comprising securing the carrier plates with support members prior to finishing providing the foundation.

28. The method of claim 26 wherein the carrier plates are set in the foundation at predetermined locations.

29. The method of claim 25 further comprising arranging conduits in the foundation to route cables connected to the electrical power module.

30. The method of claim 29 further comprising transferring the electrical power to a power network located outside the wind power plant.

31. The method of claim 29 wherein arranging conduits in the foundation to route cables connected to the electrical power module further comprises arranging the conduits in the foundation prior to finishing the foundation.

32. The method of claim 25 further comprising supplying the electrical power module with electrical power furnished by the generator.

33. The method of claim 25 wherein providing the foundation includes filling the form of the foundation with concrete.

* * * * *

UNITED STATES PATENT AND TRADEMARK OFFICE
CERTIFICATE OF CORRECTION

| | |
|---|---|
| PATENT NO. | : 7,365,446 B2 |
| APPLICATION NO. | : 10/477299 |
| DATED | : April 29, 2008 |
| INVENTOR(S) | : Aloys Wobben |

It is certified that error appears in the above-identified patent and that said Letters Patent is hereby corrected as shown below:

In claim 1, col. 4, line 9, delete ":" and substitute -- ; --.

In claim 1, col. 4, line 13, delete ":" and substitute -- ; --.

In claim 1, col. 4, line 14, delete ":" and substitute -- ; --.

In claim 9, col. 4, line 51, delete "." and substitute -- , --.

In claim 9, col. 4, line 54, insert -- , -- after "carrier".

In claim 12, col. 4, line 67, delete "into".

In claim 25, col. 6, line 4, delete "Providing" and substitute -- providing --.

In claim 25, col. 6, line 6, delete ":" and substitute -- ; --.

In claim 26, col. 6, line 20, delete "Includes" and substitute -- includes --.

Signed and Sealed this

Twenty-second Day of July, 2008

JON W. DUDAS
*Director of the United States Patent and Trademark Office*